Oct. 3, 1967  D. G. BRAKE  3,344,700
DISPLACEMENT MEASURING SYSTEM
Filed May 14, 1962  4 Sheets-Sheet 1
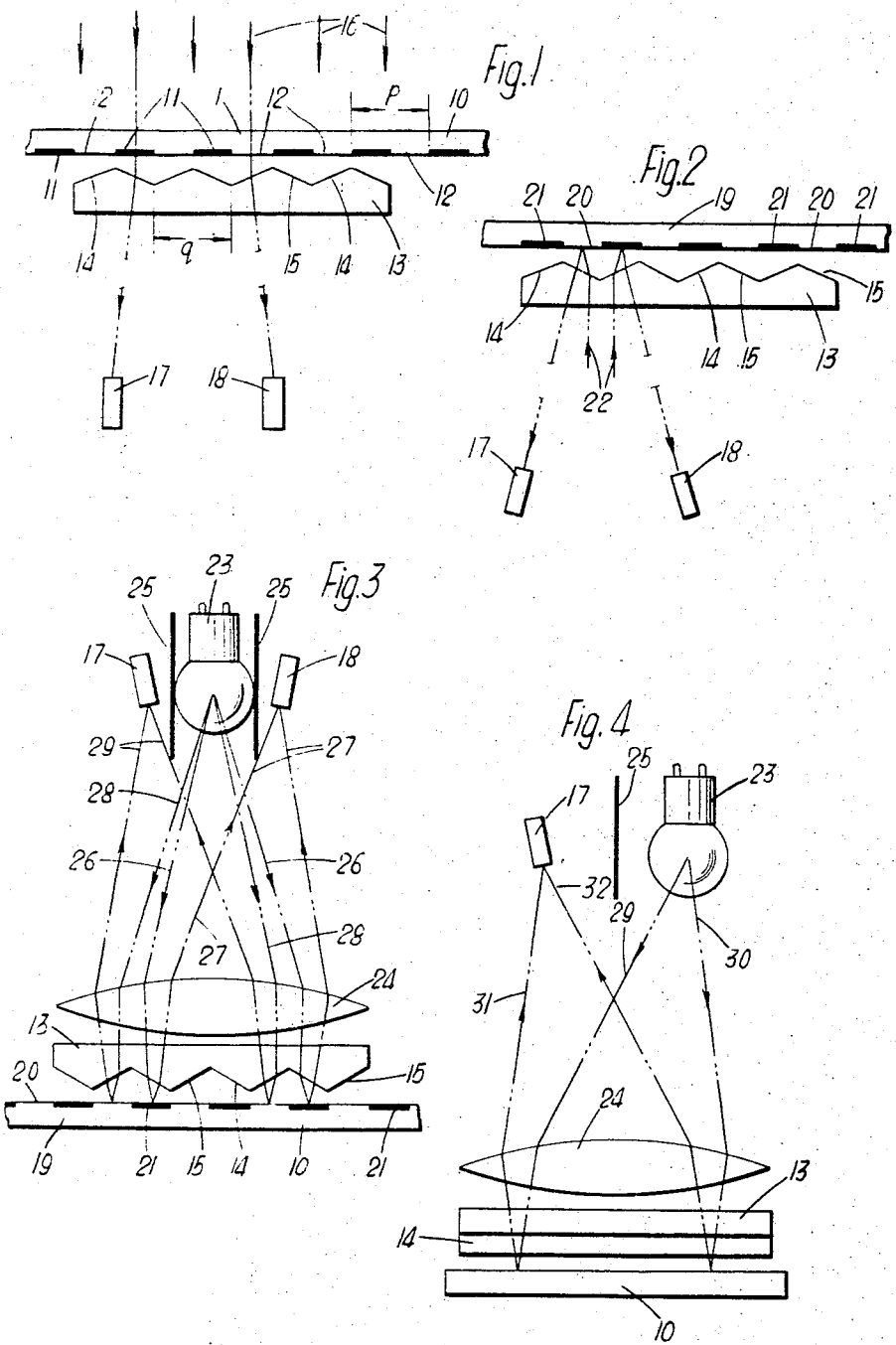
INVENTOR
David George Brake
by Roberts, Cushman & Grover
ATTORNEYS Oct. 3, 1967
D. G. BRAKE
3,344,700
DISPLACEMENT MEASURING SYSTEM
Filed May 14, 1962
4 Sheets-Sheet 2
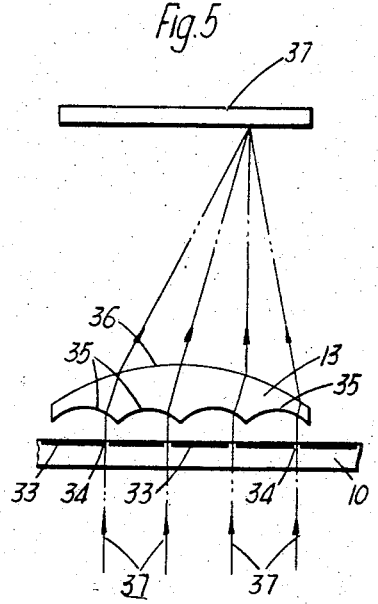
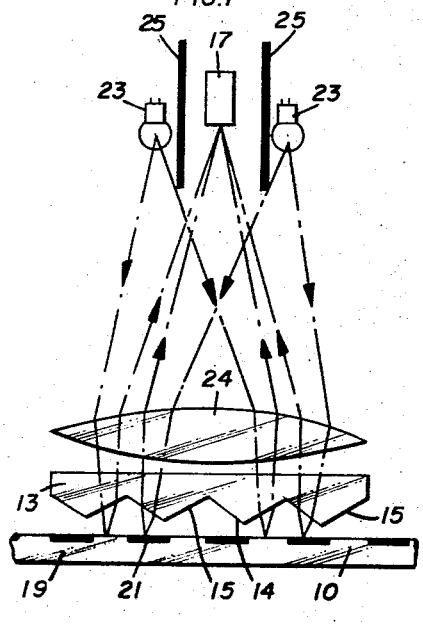

Fig.6a
| n | R | ℓ | S | |
|---|---|---|---|---|
| 1 | P | $\frac{P}{2}$ | $\frac{P}{2}$ | 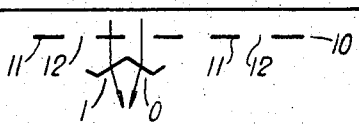 |
| 2 | P | $\frac{P}{2}$ | NONE | 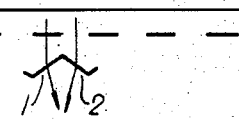 |
| 3 | P | $\frac{P}{3}$ | NONE | 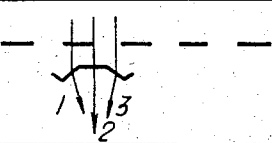 |
| 3 | 2P | $\frac{2P}{3}$ | NONE | 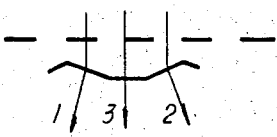 |
| 3 | 2P | $\frac{P}{2}$ | $\frac{P}{6}$ | 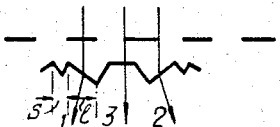 |
| 4 | P | $\frac{P}{4}$ | NONE | 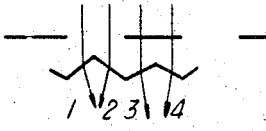 |
| 4 | 3P | $\frac{3P}{4}$ | NONE | 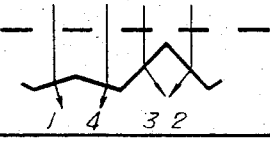 |
| 4 | 3P | $\frac{P}{2}$ | $\frac{P}{4}$ | 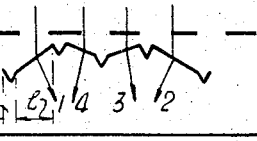 |

Fig.6b
| n | R | ℓ | S | |
|---|---|---|---|---|
| 4 | 5P | $\frac{P}{2}$ | $\frac{P}{4}$ | 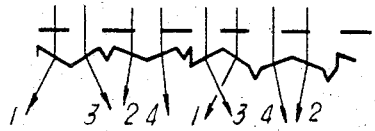 |
| 5 | P | $\frac{P}{5}$ | NONE | 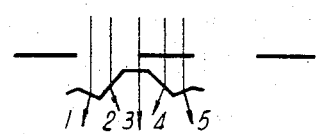 |
| 5 | 2P | $\frac{2P}{5}$ | NONE | 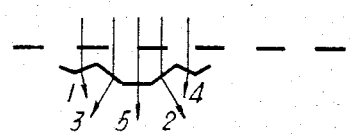 |
| 5 | 3P | $\frac{3P}{5}$ | NONE | 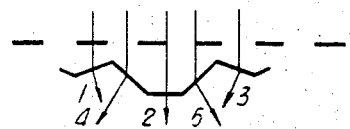 |
| 5 | 3P | $\frac{P}{2}$ | $\frac{P}{10}$ | 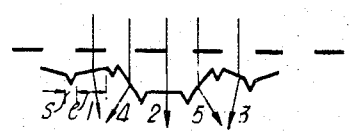 |
| 10 | P | $\frac{P}{10}$ | NONE | 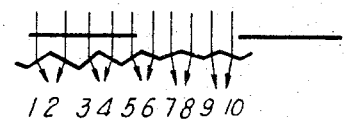 |
| 10 | 7P | $\frac{P}{2}$ | $\frac{P}{10}$ | 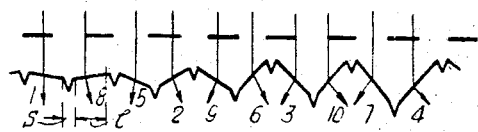 |
| INFINITE | P | P | NONE |  |

United States Patent Office 3,344,700
Patented Oct. 3, 1967

3,344,700
DISPLACEMENT MEASURING SYSTEM
David George Brake, Langley, England, assignor, by mesne assignments, to British Aircraft Corporation (Operating) Limited, Stevenage Hertfordshire, England, a British company
Filed May 14, 1962, Ser. No. 194,549
Claims priority, application Great Britain, May 23, 1961, 18,633/61
17 Claims. (Cl. 88—14)

This invention relates to measuring apparatus for accurately measuring the relative movement of two objects of the kind comprising a divided scale that is fixed with respect to one of the objects and a reading head that is fixed with respect to the other of the objects, and that comprises a plurality of reading elements that extend over and co-operate with a plurality of the divisions of the scale so that a degree of averaging out of any errors of pitch of the scale is attained or so that a vernier effect may be produced in cases where the pitch of the reading elements differs from that of the scale divisions.

The scales of such measuring apparatus may be light reflecting or light transmissive and are usually finely divided by substantially uniformly pitched relatively non-reflecting or relatively non-transmissive lines or bands. The scales of such measuring apparatus are frequently rectilinear, and for convenience the invention will be described in connection with such rectilinear scales. It will be understood, however, that the invention is also applicable to circular or spiral or helical scales extending in one or more convolutions over a flat or cylindrical surface, in which cases the reading elements that are presented to the scale lie in a surface similar to that containing the scale. However, by considering the linear development of such curved scales, the application of the present invention to them will be apparent.

For convenience the pitch of the scale divisions of a scale will, in the following description, be regarded as 360° of spatial phase difference, and references to phase, phase bands and phase difference should be understood in this sense.

The principal object of the invention is to provide an improved construction of reading head that is relatively cheap and easy to manufacture, that is compact and that is adaptable to various slightly different applications. Another object of the invention is to prevent or to reduce direct reflections of light from surfaces of the elements of the reading head to the light indicating or light responsive device or devices used in conjunction with the head, which reflections tend to dilute the light reaching the indicating or responsive device or devices and emanating from the scale. Other objects that may be realized in connection with specific applications will appear later.

It will be appreciated that, like most optical systems, the systems of the kind referred to are completely reversible, by which it is meant that the source of light and the means of utilizing the light may be interchanged in position relative to the optical elements of the light transmission channel or channels interconnecting them. Such interchange is therefore included within the present invention in all cases.

The invention is particularly applicable, but not restricted, to the system of measurement of relative movement of two parts embodying a reading head of the type in which two or more groups of windows are presented to the scale, one group covering corresponding portions or phase-bands only of the pitches of the scale divisions, these phase-bands being spaced at an integral number of pitches, and another group covering other similarly spaced complementary portions or phase-bands only of the scale divisions. Such measurement systems may conveniently be referred to as "polyphase" systems.

Reading heads of this type are known that comprise two or more photoelectric detectors so arranged that the several detectors are responsive to different phase-bands of the scale. Methods are known (for example as described in Proc. I.E.E., Part B, November 1960 pp. 624–653) for converting the polyphase signals corresponding with the different phase-bands of the scale into analogue or digital interpretations of fractions of a pitch of the relative positions or movements of the scale and reading head. In one known arrangement for reading such scales, the reading head comprises an optical grating, similar to a diffraction grating, such as a bar and slit grating, the pitch of which is equal to the pitch of the divisions of the scale and the lines or bars of which lie in a plane parallel with and close to that of the scale but are inclined to the divisions of the scale, so that a "moire" pattern is produced, the photoelectric detectors being severally responsive to different parts of this "moire" pattern. In another arrangement for securing this result, the reading head comprises a plurality of separate gratings, each having a pitch equal to that of the divisions of the scale, but spaced from one another along the scale by a distance equal to a quite large number of pitches plus or minus a spatial phase difference of less than 360°, a corresponding plurality of photoelectric detectors being severally responsive to light traversing different gratings. Both of these arrangements suffer from a disadvantage in that the several photoelectric detectors are responsive to light from different portions of the scale. Thus a defect in or on the scale, such for example as localized dirt thereon, may affect one detector only at any one time and thus cause an error of reading. Similarly uneven illumination of the scale may cause error in the reading. A further object of the present invention is to provide a reading head of the type set forth that does not suffer so seriously from the disadvantage referred to.

In such prior arrangements, moreover, the reading head comprised a bar-and-slit type grating, which inherently entails that a large portion of the area of the reading head, generally about one half, does not transmit useful light. A still further object of the invention is to utilize more effectively than heretofore the total area of the reading head by minimizing the area occupied by non-active portions thereof, which non-active portions amount to at least one half of the area in such known reading heads.

According to the present invention, in a measuring apparatus of the kind set forth, either a face of the reading head upon which light impinges (either before or after impinging on the scale) is serrated or corrugated so that light rays emanating from different points of the scale that are spaced apart from one another but are within one pitch length of the scale divisions of one another longitudinally of the scale are differently deflected at that surface.

In carrying out the invention, the deflection to produce relative angular divergence of the light rays is produced by refraction at different facets of a serrated or corrugated face of a refracting body.

In a preferred general method of carrying out the invention, a reading head adapted for juxtaposition to a scale or to an image thereof in a measuring system of the kind set forth and to extend over a plurality of pitches of the scale divisions comprises a body of transparent material having an optical refractive index differing from that of the surrounding medium, which is usually but not essentially air, and having two opposite faces, one for juxtaposition to the scale or to an image thereof to have incident upon it light from the scale and/or to transmit light to the scale and the other for the emergence of light emanating from the scale or to have incident upon it light for transmission to the scale, wherein at least one of these two opposite faces is serrated or corrugated so that light rays propagated by (by transmission thereby or reflection thereat) different points of the scale that are spaced apart from one another but are within one pitch length of the scale divisions of one another longitudinally of the scale are so differently refracted by the body as to emerge therefrom at different angles (one or some of which may be zero degrees) to the normal to the general surface of the face that is adapted to be juxtaposed to the scale or at different angles to the normal to the scale.

In carrying out the invention, at least the major portion of the serrated or corrugated face is preferably oblique to the normal to the general surface that is to be juxtaposed to the scale, or oblique to the normal to the scale.

Either the face for juxtaposition to the scale or to an image thereof or the opposite face for the emergence or incidence of light may be serrated or corrugated, and the other face may be non-serrated or non-corrugated. That other face may however, be curved cylindrically, spherically or aspherically so as to bring to convergence at focal lines or focal points substantially parallel light rays incident on it.

The serrations or corrugations may be formed by mutually inclined flat facets, the intersections of which lie in planes perpendicular to the longitudinal dimensions of the head. However, particularly in cases where the scale is divided by relatively wide light transmissive or light reflective strips separated by relatively narrow opaque or non-reflective strips, or by relatively narrow light transmissive or light reflective lines separated by relatively wide opaque or non-reflective bands, the serrations or corrugations may be formed by concave or convex cylindrical surfaces with their axes parallel with the transverse dimension of the head.

For the better appreciation of the invention, certain specific examples will now be described with reference to the accompanying drawings in which:

FIG. 1 is an optical diagram illustrating in principle the application of the invention to a two phase measuring system employing a light transmitting scale in which the direction of the pitch of the corrugations or serrations is parallel with the pitch of the divisions of the scale:

FIG. 2 is an optical diagram illustrating in principle the application of the invention to a two phase measuring system employing a light reflecting scale; in which the direction of the pitch of the corrugations or serrations is parallel with the pitch of the divisions of the scale;

FIG. 3 is an optical diagram illustrating in greater detail a particular manner of applying the invention to a two phase measuring system employing a light reflecting scale in which the direction of the pitch of the corrugations or serrations is parallel with the pitch of the divisions of the scale;

FIG. 4 is an optical diagram illustrating another particular manner of applying the invention to a two phase measuring system employing a light reflecting scale in which the direction of the pitch of the corrugations or serrations is parallel with the pitch of the divisions of the scale;

FIG. 5 is an optical diagram illustrating the application of the invention to a measuring system employing a light transmitting scale divided by relatively broad opaque bands separated by relatively narrow light transmitting lines;

FIGS. 6a and 6b are charts demonstrating various specific arrangements of repetition length R of the reading head, length of facets 1 and lengths S of any non-light-transmissive spacers in terms of the pitch P of the scale divisions for the utilization of different numbers of phases $n$ in a polyphase measuring system such as illustrated in FIGS. 1, 2, 3 and 4.

FIG. 7 is an optical diagram showing a modification of FIG. 3.

Referring now to FIG. 1 of the accompanying drawings, which may be regarded as a diagrammatic section in a plane containing the longitudinal dimension of the scale and reading head and perpendicular to the plane of the scale, the scale 10 is of transparent material and is divided by opaque strips 11 and transparent strips 12 of equal width. The reading head comprises a body 13 of transparent material that may be glass but may well be a transparent plastic material such as that known as "Perspex." The scale 10 and body 13 are mounted one on each of relatively movable parts of a machine, for example, so that the body 13 is closely adjacent to the scale 10, the direction of relative movement being horizontally in the plane of the diagram. The face of the body 13 that is next to the scale 10 is corrugated or serrated by flat facets 14 and 15 that are equally and oppositely inclined to the normal to the general planes of the faces of the body 13 and to the normals to the surface of the scale 10. The pitch $q$ of the serrations or corrugations formed by the facets 14 and 15 is equal to the pitch $p$ of the scale divisions 11 and 12. Collimated light, indicated by arrows 16, is projected on the transparent scale 10. Two light detectors such as photoelectric cells 17 and 18, or two sets of photoelectric coils, are so arranged for example at some distance and with sufficient light-receiving aperture as to receive light passing through the scale 10 and differently refracted, in the case shown at equal but opposite angles to the normals to the scale 10 and general planes of the faces of the body 13, by all of the facets 15 and all of the facets 14 respectively. It will be appreciated that each of the facets 14 and 15 covers and receives light only from 180° of the pitch of the scale divisions, and that, as the scale 10 and body 13 are moved relatively to one another, the varying signals proportional to the light intensity falling upon them are 180° out of phase with one another. Any light that may be reflected at the facets 14 and 15 does not reach the detectors 17 and 18, and so there is no dilution of the useful light falling upon them.

FIG. 2 may, again, be regarded as a diagrammatic section in a plane containing the longitudinal dimension of the scale and reading head and perpendicular to the plane of the scale. As illustrated in FIG. 2, the scale 19 is opaque and is divided by reflective strips 20 and non-reflective strips 21. The reading head is precisely similar to that described with reference to FIG. 1, having facets 14 and 15 forming corrugations or serrations of which the pitch is equal to that of the scale 19. In this case, however, collimated light indicated by the arrows 22 is directed upon the flat face of the body 13 that is remote from the scale 19. This light is refracted at the facets 14 and 15 respectively, is reflected from the reflective parts 20 of the scale almost entirely back to the same facets, where it is again refracted so as to fall upon the detectors 18 and 17 respectively. Any light that may be reflected from the facets 14 and 15 is directed away from the detectors 18 and 17 respectively. Again, as the body 13 and scale 19 move relatively to one another, the signals generated by the detectors 17 and 18 are displaced in phase by 180°.

FIG. 3 is, again, a diagrammatic section in a plane containing the longitudinal dimension of the scale and reading head and perpendicular to the plane of the scale, and illustrates in more detail one practical arrangement utilizing a single lens 24, for collimating the light from a source on to the reading head body 13 and reflective scale 19, and for collecting the light from the facets 14 and 15 and focussing it upon the detectors 18 and 17 respectively. A small light source in the form of a lamp 23 is disposed between the detectors 17 and 18.

Light from the lamp 23 falls upon the lens 24, that may be spherical, aspherical or cylindrical, and is collimated to parallelism thereby to fall as a parallel beam upon the outer flat face of the body 13. The body 13 and scale 19 are precisely as described with reference to FIG. 2. The detectors 17 and 18 are disposed symmetrically on opposite sides of the lamp 23 and opaque screens 25 are interposed between the lamp 23 and the detectors. Typical light rays 26 from the lamp 23 pass through facets 14, being refracted at these facets, and the corresponding rays 27 reflected by the scale 19 are again refracted by the facets 14 and are focussed by the lens 24 upon the detector 18. Correspondingly, typical rays 28 are collimated by the lens 24, are refracted by the facets 15, are reflected by the scale 19 and are again refracted by the facets 15, and the emergent rays 29 are focused by the lens 24 upon the detector 17. As can be readily seen, most of the light that may be reflected directly at any of the surfaces of the body 13 will not reach either of the detectors 17 and 18.

FIG. 4 is a diagrammatic section in a plane perpendicular to the longitudinal dimension of the scale and reading head, and illustrates another two-phase arrangement utilizing an opaque reflective scale. The arrangement of the scale 10, body 13 and lens 24 are similar to that illustrated in FIG. 3, except that the lens is spherical or aspherical, the lamp 23 is located in the focal plane of the lens 24 at one side of the longitudinal plane normal to the scale 10 and general faces of the body 13, and the two detectors 17 and 18 are located one behind the other symmetrically on the other side of that plane. An opaque screen 25 is interposed between the lamp 23 and detectors 17 and 18. Thus typical rays 29 and 30 from the lamp 23 are collimated by the lens 24, are refracted by the facet 14 to fall upon the scale 10 at an angle to the normal thereto. The corresponding reflected rays 31 and 32 reflected from the scale 10 are again refracted by the facet 14 and are brought to a focus at the detector 17. Correspondingly rays (not shown) from the lamp 23 falling on a facet 15 are refracted thereby, are reflected by the scale 10, are again refracted by the facet 15 and are focused by the lens 24 upon the other detector (not shown). Any light that may be directly reflected by the surfaces of the flat face of the body 13, by the facets 14 and 15 or by the major portions of the lens 24 does not fall upon either of the detectors.

The arrangement diagrammatically illustrated in FIG. 5 employs a light transmitting scale 10 which is divided by relatively wide opaque strips 33 and relatively narrow transparent strips 34. In this case the serrations of the body 13 are formed by concave cylindrical surfaces 35 with their axes parallel with the bands 33 and the lines 34 of the scale. Also the opposite face of the body 13 is curved to constitute a cylindrical refracting surface or lens 36. Instead of two or more separate photoelectric detectors, a simple translucent screen 37, of ground glass for example, is employed.

In this arrangement collimated light rays, indicated by arrows 37 are directed upon the scale 10 and pass only through the transparent lines or slits 34 thereof to fall upon and be refracted by the cylindrical surfaces 35. These rays are refracted from their orignal direction by angles that depend upon the relative positions of the slits and the axes of the cylindrical surfaces 35. The lens surface 36 collects the light from the various transparent lines 34 and refracted by the various cylindrical surfaces 35 and brings it to a focus as a line image on the translucent screen 37, the resultant pattern on which may be visually assessed.

In some cases, particularly those of polyphase systems employing more than two phases, it is necessary or desirable to interpolate non-light transmissive spacers between adjacent facets or corrugations of the body 13. The arrangements described and illustrated may be modified to suit various specific numbers of phases and phase orders. FIGS. 6a and 6b constitute a chart relating the number of phases, $n$, the overall length or repetition length, $R$, of the reading head in terms of pitch, $P$, of the divisions of the scale, the length of one flank or facet $l$ of a serration or corrugation in terms of the scale pitch $P$ and the longitudinal dimensions of any non-transmissive spacers employed for a variety of different phase arrangements for systems such as those illustrated in FIGS. 1 to 4 inclusive. The column at the right hand side of FIGS. 6a and 6b comprises diagrams representative of sections in a longitudinal plane of the scale and corrugated or serrated surface of the body 13, the arrows indicating typical light ray pattern and the numerals 1, 2, 3, 4, 5 indicating the individual phases, which are considered as appearing in that order spatially along the scale. In the diagrams non-transmissive spacers are indicated by a short abruptly angled portion. Indeed the spacers may be constituted by narrow triangular notches in the surface of the body 13 such as to refract any light impinging on them from the scale into paths that are quite clear of the detectors. It is thought that no further explanation of these charts is needed.

The serrations or corrugations of the body 13 that are characteristic of this invention may be produced in any convenient manner. However in many cases the body 13 may be moulded as a block from thermoplastic or thermosetting transparent material, the serrations or corrugations being formed in the moulding operation. Alternatively the corrugations may be machined or ground on a block of solid material. One very convenient manner of making the body 13 is to make it a stack of contiguous laminae of transparent material, each transparent laminae being of thickness corresponding to the longitudinal dimensions of one or two facets, or, in the case of cylindrical lens formation corresponding to the longitudinal dimension of the cylindrical lenses.

While in all the arrangements described and illustrated a single light source and a plurality of detectors have been indicated, the direction of the light may in all cases be reversed, two or more light sources being utilized and one detector, such as a photoelectric detector or viewing screen. Such a system is shown in FIG. 7 which is identical with FIG. 3 except for the reversal described above with two light sources 23 and one detector 17 replacing two detectors and one light source. In such cases the light sources may be, for example, intermittent in operation, so that the separate phase indications of the detector will be sequential in time.

In some applications of the invention the serrations or corrugations that are typical of the invention may be formed in the surface of a disc, or a cylindrical bar or tube as, for example, a spiral or helix thereon. In such cases the disc, bar or tube constitutes the body of the reading head and is rotated in order to position the elements of the reading head relatively to the scale. For example, if the serrations or corrugations are formed helically in the surface of a tube and the lead of the helix is equal to the pitch of the scale divisions, steady rotation of the tube through one revolution alters steadily the phasing of all the elements through 360° of spatial phase relatively to the scale.

In general the scale used with these heads will have an opaque or non-reflective line to transmissive-space ratio of approximately unity. However, if the head were to be made up of elements or facets of width greater than or less than one half of a scale pitch, the wave-form from the photo-electric or other detectors would not continuously change with change of displacement; it would be periodic with displacement through the pitch of the scale but for fractions of pitches the signal would be constant. Such signals may be unsatisfactory in interpreting the position of the reading head with reference to the scale. To overcome this, the scale pattern may be modified to a form in which both lines and spaces have sloping or curved sides (e.g. diamond shaped lines) so that, when an element scans across the line or space, the area of line or space registering with the element changes continuously, thus resulting in a constantly changing signal. One convenient form of scale is such that the width of the transmitting or reflecting part varies sinusoidally with distance along the scale, so as to result in a sinusoidal signal.

It will be appreciated that while several forms of and applications of the invention have been referred to, many modifications may be made without departing from its scope.

What I claim is:

1. A displacement measuring system comprising, in combination with a scale having scale divisions distributed longitudinally therealong with a predetermined pitch, each said division comprising alternate strips of different light propagating properties, means for illuminating said scale, and a relatively movable co-operating reading head comprising a transparent optically refracting member having a plurality of light transmitting bands distributed longitudinally therealong said refracting member receiving and transmitting light that is propagated from a length of the scale extending over a plurality of pitches of said scale divisions, each one of said refracting member bands receiving and transmitting light that is propagated from a length of the scale corresponding with an integral number of pitches of said scale divisions, and each of said refracting member bands similarly comprising a plurality of mutually inclined portions through which portions light propagated from the scale passes, and by each of which portions light is refracted through a different angle characteristic of that portion to form a ray of light from that portion, the corresponding portions of each of the plurality of said refracting member bands being equally inclined relative to the scale so that the rays of light passing from each corresponding portion of each said refracting member band together form a beam of light which is angularly separated from the beam of light so formed by the rays of light passing from the other corresponding portions of said refracting member bands.

2. A displacement measuring system comprising a scale having scale divisions formed by alternate strips of different light propagating properties spaced at uniform pitch along the scale, scale lighting means, light utilization means, and a light refracting body movable relative to the scale, characterized in that said body is disposed between the scale and light utilization means and has a plurality of repetitive sets of mutually inclined refracting portions, each set being optically juxtaposed to an integral multiple, including one, of said scale divisions, such that light beams from corresponding points in a plurality of scale divisions are refracted to said utilization means at different angles than light beams refracted from a plurality of corresponding points respectively spaced less than one pitch from the first said corresponding points, whereby said utilization means may distinguish accurately between light refracted from each said pluralities of corresponding points despite defects in particular scale divisions.

3. A system according to claim 2 wherein said body comprises actively refractive portions in excess of one half the area of the body.

4. A system according to claim 2 wherein each set of refracting portions comprises at least two adjacent mutually inclined refracting plane faces.

5. A system according to claim 2 wherein said scale lighting means comprises at least two light sources separately lighting said scale at different incident angles.

6. A displacement measuring system according to claim 1, wherein said scale includes a light reflecting surface and said scale divisions are defined on said reflecting surface by means of alternate strips of different light reflecting properties.

7. A displacement measuring system according to claim 1, wherein said scale comprises a light transmitting member and said scale divisions are defined on said light transmitting member by means of alternate strips of different light transmitting properties.

8. A displacement measuring system according to claim 1, wherein said reading head includes a plurality of light sensing devices, each such light sensing device being positioned to detect one of said angularly separated beams of light.

9. A displacement measuring system according to claim 1, wherein said means for illuminating said scale includes an electric lamp and means for collimating the light emanating therefrom.

10. A displacement measuring system according to claim 1, wherein said means for illuminating said scale includes an electric lamp and means for collimating the light falling on said scale therefrom, said lamp and said collimating means being carried in said reading head, and said reading head further includes, at least two photoelectric cells, each positioned on said reading head so as to detect one of said angularly separated beams of light.

11. A displacement measuring system according to claim 10, wherein said collimating means comprises a lens, said lens also being arranged to focus said beams of light onto said respective cells.

12. A displacement measuring system according to claim 1, and including comparison means responsive to said angularly separated beams for comparison of the intensities of said angularly separated beams.

13. A displacement measuring system according to claim 1, wherein said refracting member band portions comprise facets.

14. A displacement measuring system according to claim 13, wherein said refracting member band portions comprise non-light transmissive spacers interposed between said facets.

15. A displacement measuring system according to claim 1, wherein said refracting member bands comprise an infinite number of said portions forming a curved refracting surface, each such refracting member band corresponding with a single pitch of said scale divisions, and wherein said angularly separated beams are infinite in number.

16. A displacement system according to claim 1 including light utilization means and lens means disposed relatively to said scale and light utilization means to focus light from a plurality of said refracting member bands on said light utilization means.

17. A displacement measuring system comprising, in combination with a reflective scale having scale divisions distributed longitudinally therealong with a predetermined pitch, each said division comprising alternate strips of different light reflecting properties, a relatively movable cooperating reading head comprising a plurality of light sources, a photoelectric cell, a transparent optically refracting member, a lens arranged to collimate the light emanating from said light sources and direct collimated light therefrom onto said reflective scale through said refracting member, said refracting member having a plurality of light transmitting bands distributed longitudinally therealong and said refracting member transmitting light to and receiving light reflected from a length of the scale extending over a plurality of pitches of said scale divisions, each one of said refracting member bands transmitting light to and receiving reflected light from a length of the scale corresponding with an integral number of pitches of said scale divisions and each of said refracting member bands comprising a plurality of mutually inclined portions through which portions light transmitted to and received from the scale passes, the corresponding portions of each of the plurality of said refracting member bands being equally inclined to the scale, said light sources, said lens and said cell being so arranged that light is directed from each light source through a corresponding portion of each refracting member band to said cell.

(References on following page)

References Cited

UNITED STATES PATENTS

| | | | |
|---|---|---|---|
| 2,886,718 | 5/1959 | Shepherd et al. | 88—14 |
| 2,948,890 | 8/1960 | Barth et al. | 88—14 |
| 3,118,069 | 1/1964 | Guillant | 88—14 |

FOREIGN PATENTS

| | | |
|---|---|---|
| 818,981 | 8/1959 | Great Britain. |
| 1,213,598 | 11/1959 | France. |

JEWELL H. PEDERSEN, *Primary Examiner.*

R. L. WIBERT, *Assistant Examiner.*